United States Patent
Hwong et al.

(10) Patent No.: US 6,457,055 B1
(45) Date of Patent: Sep. 24, 2002

(54) CONFIGURING ETHERNET DEVICES

(75) Inventors: Jim Hwong, Saratoga; Victor Ge, San Jose, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/310,469

(22) Filed: May 12, 1999

(51) Int. Cl.[7] .................................................. G06F 15/16
(52) U.S. Cl. ...................... 709/227; 709/202; 709/228; 709/237; 370/242; 370/282; 375/220
(58) Field of Search ................................. 709/202–203, 709/227–228, 237–238, 240, 250; 370/241–242, 282, 433, 449, 464, 908; 375/219–220, 316

(56) References Cited

U.S. PATENT DOCUMENTS

| | | | | |
|---|---|---|---|---|
| 5,737,108 A | * | 4/1998 | Bunch et al. | 359/152 |
| 5,907,553 A | * | 5/1999 | Kelly et al. | 370/433 |
| 5,920,705 A | * | 7/1999 | Lyon et al. | 709/240 |
| 6,065,073 A | * | 5/2000 | Booth | 709/203 |
| 6,198,727 B1 | * | 3/2001 | Wakeley et al. | 370/247 |
| 6,215,816 B1 | * | 4/2001 | Gillespie et al. | 375/219 |

* cited by examiner

Primary Examiner—Bharat Barot
(74) Attorney, Agent, or Firm—McDonnell Boehnen Hulbert & Berghoff

(57) ABSTRACT

An improved method and device for connecting Ethernet network devices at desired settings, including speed and duplex mode. The connected devices include a local device and a link partner device. At least the local device will include auto-negotiation and parallel detection capabilities, along with the decision steps to establish a matched connection, or to fail the connection. The steps include determining and storing the supported device abilities. Parallel detection is performed, and if the link partner device supports auto-negotiation, then a highest compatible connection is established, or a failed connection is indicated as appropriate. If a parallel detect fault occurs, then a failed connection is also indicated. If no parallel detection faults, then the local device is checked for an auto-mode setting. If in auto mode, then the stored link partner abilities are retrieved and the local device is set. If not in auto mode, then the local device is set to user specified settings. The methods steps can be performed as device driver, firmware, or related software tasks.

20 Claims, 8 Drawing Sheets

| | | DEVICE WITHOUT IMPLEMENTATION OF INVENTION 800 | | | | | |
|---|---|---|---|---|---|---|---|
| | | AUTO | 100 FULL | 100 HALF | 10 FULL | 10 HALF | 100T4 |
| DEVICE WITHOUT IMPLE- MENTATION OF INVENTION | AUTO | 100 FULL | PROB. N1 | 100 HALF | PROB. N1 | 10 HALF | 100T4 |
| | 100 FULL | PROB. N1 | 100 FULL | PROB. N1 | PROB. N2 | PROB. N2 | PROB. N3 |
| | 100 HALF | 100 HALF | PROB. N1 | 100 HALF | PROB. N2 | PROB. N2 | PROB. N3 |
| | 10 FULL | PROB. N1 | PROB. N2 | PROB. N2 | 10 FULL | PROB. N1 | PROB. N3 |
| | 10 HALF | 10 HALF | PROB N2 | PROB. N2 | PROB. N1 | 10 HALF | PROB. N3 |
| | 100T4 | 100T4 | PROB. N3 | PROB. N3 | PROB. N3 | PROB. N3 | 100T4 |

| | | DEVICE WITHOUT IMPLEMENTATION OF INVENTION | | | | | |
|---|---|---|---|---|---|---|---|
| | | AUTO | 100 FULL | 100 HALF | 10 FULL | 10 HALF | 100T4 |
| DEVICE WITH IMPLEMENTATION OF INVENTION | AUTO | 100 FULL | PROB. N1 | 100 HALF | PROB. N1 | 10 HALF | 100T4 |
| | 100 FULL | 100 FULL, N.4 | PROB. N1 | PROB. N2 | PROB. N2 | PROB. N3 | PROB. N3 |
| | 100 HALF | 100 HALF | PROB. N1 | 100 HALF | PROB. N2 | PROB. N2 | PROB. N3 |
| | 10 FULL | 10 FULL, N.4 | PROB. N2 | PROB. N2 | 10 FULL | PROB. N1 | PROB. N3 |
| | 10 HALF | 10 HALF | PROB. N2 | PROB. N2 | PROB. N1 | 10 HALF | PROB. N3 |
| | 100T4 | 100T4 | PROB. N3 | PROB. N3 | PROB. N3 | PROB. N3 | 100T4 |

FIG. 18

| | | DEVICE WITH IMPLEMENTATION OF INVENTION | | | | | |
|---|---|---|---|---|---|---|---|
| | | AUTO | 100 FULL | 100 HALF | 10 FULL | 10 HALF | 100T4 |
| DEVICE WITH IMPLEMENTATION OF INVENTION | AUTO | 100 FULL | 100 FULL | 100 HALF | 10 FULL | 10 HALF | 100T4 |
| | 100 FULL | 100 FULL | 100 FULL | FAIL | 10 FULL | FAIL | FAIL |
| | 100 HALF | 100 HALF | FAIL | 100 HALF | FAIL | FAIL | FAIL |
| | 10 FULL | 10 FULL | 10 FULL | FAIL | 10 FULL | FAIL | FAIL |
| | 10 HALF | 10 HALF | FAIL | FAIL | FAIL | 10 HALF | FAIL |
| | 100T4 | 100T4 | FAIL | FAIL | FAIL | FAIL | 100T4 |

CONFIGURING ETHERNET DEVICES

BACKGROUND OF THE INVENTION

1. Field of the Invention

The present invention relates to an improved method and apparatus for connecting Ethernet network devices wherein settings such as the speed and duplex mode of two linked devices are matched, or the connection fails, to prevent transmission errors and data collisions or conflicts on faulty connections.

2. Description of Related Art

The term Ethernet refers to a family of local area network (LAN) implementations that includes three principal categories: (i) Ethernet and IEEE 802.3. These are both LAN specifications that operate at 10 Mbps (megabits per second) over for instance thick and thin coaxial cable, or twisted pair cable. (ii) 100-Mbps Ethernet. This is a single LAN specification that operates at 100 Mbps over fiber and twisted-pair cables. It is also known as Fast Ethernet because it is 10 times faster than the older 10 Mbps standard. This is defined in IEEE standard 802.3u (iii) 1000-Mbps Ethernet. This is a single LAN specification, also known as Gigabit Ethernet, that operates at 1000 Mbps (1 Gpbs) over fiber and twisted-pair cables. Ethernet has survived as an essential media technology because of its tremendous flexibility and its relative simplicity to implement and understand. Although other technologies are touted as likely replacements, network managers continually turn to Ethernet and its derivatives as effective solutions for a range implementation requirements.

Ethernet and IEEE 802.3 specify similar technologies. Both use CSMA/CD (Carrier Sense Multiple Access/Collision Detection) for media access control. Stations on a CSMA/CD LAN can access the network at any time. Before sending data, stations "listen" to the network to see if it is already in use. If so, the station waits. If the network is not in use, the station transmits. A collision (or conflict) occurs when two stations listen for network traffic, "hear" none, and transmit simultaneously. In such a case, both transmissions are damaged and the stations must back off and retransmit at some later time.

Differences between Ethernet and IEEE 802.3 LANs are subtle. Ethernet provides services corresponding to Layers 1 and 2 of the OSI reference model. IEEE 802.3 specifies the physical layer (Layer 1) and the channel-access portion of the link layer (Layer 2), but does not define a logical link control protocol. Both Ethernet and IEEE 802.3 are typically implemented in hardware. The physical manifestation of these protocols is either an interface card in a host computer or circuitry on a primary circuit board within a host computer. IEEE 802.3 specifies several different physical layers, whereas Ethernet defines only one. Each 802.3 physical layer has a name which summarizes its characteristics. Such names include, for instance, 10Base5, 10Base2, 1Base5, 10BaseT, and 10Broad36. 10Base2 is the physical layer most similar to Ethernet and has characteristics including a 10 Mbps data rate, a baseband signaling method, a maximum segment length of 500 feet, a 50-ohm coax connection media, and a bus topology. The IEEE standard 802.3 and IEEE 802.3u, referred to throughout this document, is herein incorporated by reference.

To support the many different technologies that are on the market today, Clause 28 of the IEEE standard in 802.3u provides for an auto-negotiation capability in such IEEE 802.3 and IEEE 802.3u compatible devices. An auto-negotiation device advertises its abilities and detects the abilities of the connected remote device, known as a link partner. The introduction of physical layer auto-negotiation defined in IEEE 802.3u allows the Ethernet devices at both ends of the connection to build a link using the highest commonly supported speed and duplex mode. However, it is also desirable to build a connection between two Ethernet devices using a specific speed and duplex mode. This is particularly true for testing or measurement purposes, or laboratory environments.

Typically, Ethernet devices provide a user interface so that the device can be set to either "auto" mode (i.e. auto-negotiation mode), or alternatively set to a specific speed and duplex mode. In current Ethernet devices, if a device is set to auto mode, it will build a connection with its link partner device using auto-negotiation. However, if a device is set to a specific speed and duplex mode, then that device will not go through auto-negotiation, it will enter that preset mode regardless of the mode of the link partner device. In other words, even if the link partner device is set to auto mode, the current device will stay in its preset speed and duplex mode. This can often lead to various problems in establishing the Ethernet connection. Such problems are associated with mismatched speed or duplex modes at the two ends.

Accordingly, what is needed in the field is an Ethernet device which will negotiate a usable connection with a linked partner device, even if particular speed or duplex mode settings are imposed upon a particular device. A series of decision steps can be used, in association with the auto-negotiation capabilities, to build a collision or conflict free connection at a user specified speed and duplex mode, or to designate the connection as failed.

SUMMARY OF THE INVENTION

Various embodiments of the invention provide an improved method and apparatus for configuring connections between network devices, in particular those including Ethernet compliant devices. Existing Ethernet connections which are established using IEEE 802.3 protocols perform auto negotiation when the respective devices are set to auto negotiation mode. However, the improved method will provide an Ethernet connection which will be properly matched with its link partner device, even if the device is set to a specific speed and/or duplex mode. If the device is not configured in auto mode, the user specified speed/duplex mode will be recalled and used to configure the device. As a result of the present invention, backward compatibility is provided between a device which incorporates the present method and a device which does not.

Various embodiments of the invention provide an improved method and apparatus for connecting Ethernet devices wherein settings such as the speed and duplex mode of two linked devices are matched, or the connection fails, to prevent faulty connections. This is achieved (i) by using auto-negotiation processes even if the device is set to a specific speed and/or duplex mode and (ii) by adding additional an additional step to auto-negotiation method to provide backward compatibility in certain full duplex configurations between a device which incorporates the present method and a device which does not.

For instance, even if the user specifies certain speed and duplex mode settings on one device, the link partner device will provide a matched connection, or indicate a failed connection. The method and apparatus utilizes, where available, auto negotiation and parallel detection on both link devices. Device driver software and firmware implements a series of method steps for storing and retrieving configuration settings, and then applying them to the linked devices for achieving a collision or conflict free connection.

Ethernet devices are configured at a certain speed and duplex mode. The IEEE 802.3 standard provides for auto negotiation between two devices which will match the speed and duplex mode at the two ends of a connection. Parallel detection is also used which allows detection of link partners in devices that support 100BASE TX, 100BASE T4, and/or 10BASE T, but do not support auto negotiation.

Using the improvement provided by the present method, Ethernet devices need be configured to "auto" mode or configured to a specific speed and duplex mode through a hardware or software user interface. If the device is set to auto mode, the device's configuration will be saved in such a way that all its supported configuration abilities will be advertised during the auto negotiation process. If the device is not set to auto mode, then the device's configuration will be saved in such a way that only the specified configuration ability which corresponds to the specific speed and duplex mode, will be advertised during auto-negotiation process.

For Ethernet devices using the present invention, the auto-negotiation process starts upon certain initiating events. In Clause 28 of IEEE standard 802.3 u, parallel detection mechanism is described which allows detection of link partner devices that support 100BASE-TX, 100BASE-T4 and/or 10BASE-T but do not support auto-negotiation. Parallel detection is performed before auto-negotiation starts, and auto-negotiation will not start if at least one of the Normal Link Pulse. Receive Link Integrity Test functions, or the 100BASE-TX or 100BASE-T4 PMAs establishes a link status of "ready" when the auto-negotiation wait timer expires. If parallel detection is successfully completed, then the parallel detection function sets the bit in the link partner ability register which corresponds to the technology detected by the parallel detection function. If the link partner supports auto-negotiation, then a connection is established using the highest common capability, or the connection fails if the connection cannot be made according to user specified settings. If the link partner does not support auto-negotiation then a parallel fault detection register is checked. If there was a parallel fault, then the connection fails. If there was not a parallel fault, then the device is checked for a setting of "auto" mode. If the device is set to "auto," then the Link Partner Ability Register is read and the physical device (PHY) is set accordingly. If the device is not set to "auto," then the physical device is set the user specified speed and duplex mode. This provides backward compatibility in certain full duplex configurations between a device which incorporates the present method and a device which does not.

According to these steps, which are performed as software and/or firmware operations in a networking device, a collision or conflict free link can be negotiated between two devices which are matched in both speed and duplex mode. The present invention provides an improvement over existing IEEE connection methods by providing the additional step of setting the physical device to the user specified speed and duplex mode if the device is not configured in auto mode. The connection thereby allows a user to specify a speed and duplex mode on one device and achieve an matching connection on the other device. If no matching connection can be achieved, the link will fail thereby preventing a problematic and collision/conflict-prone link.

It is therefore an aspect of the present invention to provide a method, apparatus, device driver, and/or firmware, which follows a decision making process to build a connection with a link partner device at a user specified speed and duplex mode, the present invention adds the additional step over existing IEEE methods of setting the physical device to a user specified speed and duplex mode if the device is not configured in auto mode. In various embodiments of the invention, an additional step is added over existing IEEE 802.3 u auto-negotiation techniques to provide backward compatibility with the other devices having certain duplex configurations.

A further aspect of the present invention is to provide a method for connecting network devices which can use auto-negotiation on both ends of the connection, regardless of the settings imposed on that device, in order to achieve a matched link.

Still another aspect of the present invention is to provide a method for connecting network devices which can use parallel detection if auto-negotiation is not available or provided on a device.

Yet another aspect of the present invention is to provide a method for connecting network devices which uses auto-negotiation on both devices if available, and alternatively uses parallel detection. User defined speed and duplex mode settings are applied if no parallel detection faults occur and "auto" mode is not selected. Otherwise, "auto" mode is used to configure the device to the ability of the link partner via register settings.

Other aspects and advantages of the present invention can be seen upon review of the figures, the detailed description, and the claims which follow.

BRIEF DESCRIPTION OF THE FIGURES

FIG. 8 is a prior art table showing the connection results of two devices without the present invention.

FIG. 17 is a table showing the connection results when one device is implemented with the present invention, and the other device is not.

FIG. 18 is a table showing the connection results when both devices are implemented with the present invention.

DETAILED DESCRIPTION

A detailed description of the preferred embodiments of the present invention are provided with reference to FIGS. 1–16. FIGS. 1–8 show prior art depictions and results. FIGS. 9–16 show block diagrams and flow charts describing the present invention.

Figure 1:
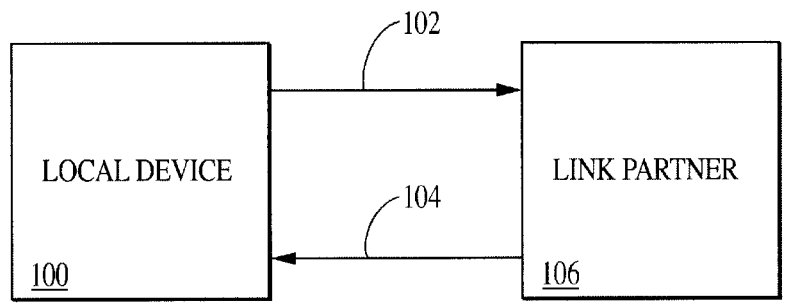
FIG. 1 is a prior art block diagram of a local device negotiating a link with a link partner device.

Referring now to FIG. 1, a prior art block diagram is shown of a local device 100 exchanging auto-negotiation synchronization signals 102, 104 with a link partner device 106. Auto-negotiation must ensure that the link partner receives a Link Code Word (LCW) correctly, and that the link partner's LCW is received correctly by the local device in order to make a connection decision. Auto-negotiation typically uses an Arbitration function to accomplish the connection.

Figure 2:
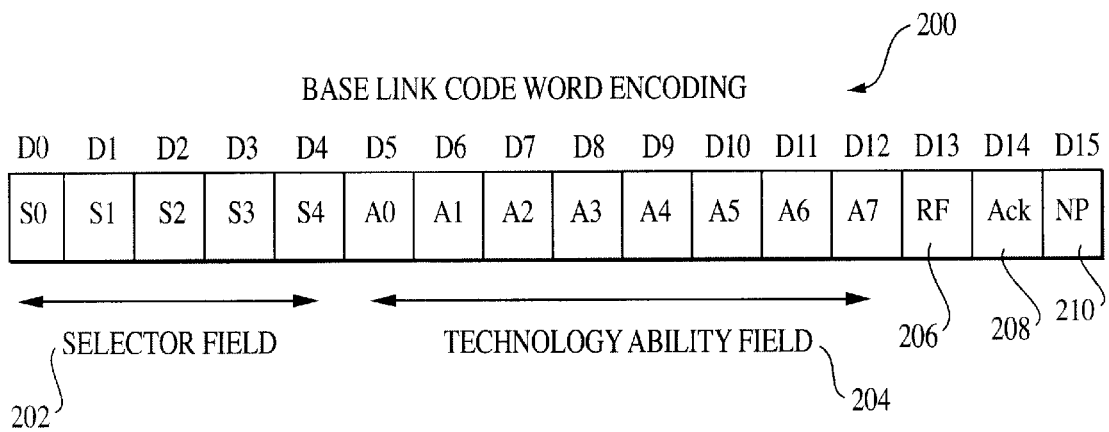
FIG. 2 is a prior art block diagram of Base Link Code Word encoding format used between two networked devices.

Referring also to FIG. 2, a bit format 200 for encoding of the base LCW is shown. Bits S0 through S3 (D0–D3) provide a Selector Field 202. Bits A0 through A7 (D5–D12) provide a Technology Ability Field 204. The Technology Ability Field is defined relative to the Selector Field value of the LCW. The Selector Field allows 32 different definitions of the Technology Ability Field to coexist. For IEEE 802.3, there are bits defined to advertise: (1) 100BASE-TX Full Duplex; (2) 100BASE-T4; (3) 100BASE-TX Half Duplex; (4) 10BASE-T Full Duplex; and (5) 10BASE-T Half Duplex. The Remote Fault (RF) bit 206 allows transmission of simple fault information to the link partner 106. The Acknowledge bit (Ack) 208 is used by the synchronization mechanism to ensure robust data transfer. The Next Page (NP) bit 210 advertises to the link partner 106 whether the Next Page function is supported.

Referring again to FIG. 1, the local device 100 begins by transmitting a Link Code Word (LCW) with the Ack bit not set. Once three consecutive matching LCWs are received from the link partner 106, the local device 100 sets the Ack bit in the transmitted LCW to indicate that it has received the LCW of the link partner 106 correctly. The local device 100 continues transmitting its LCW. Upon receiving three consecutive match LCW from the link partner 106 with the Ack bit set, the local device 100 knows that the link partner 106 has also received the LCW correctly. The local device 100 transmits the LCW with the Ack bit set an additional 6–8 times to ensure that a complete handshake has taken place. Each devices then compares their abilities to the highest performance common technology, and each device selects that configuration.

Figure 3:
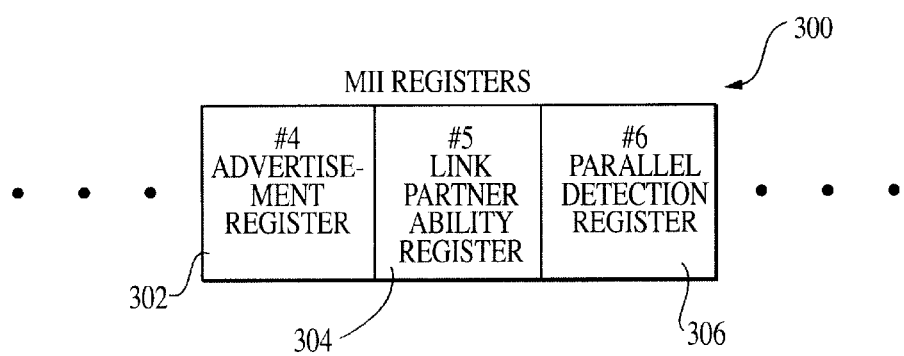
FIG. 3 is a prior art block diagram of example MII (Medium Independent Interface) registers used to achieve a compatible link.

Referring now to FIG. 3, a prior art block diagram 300 is shown of a register set known as Medium Independent Interface (MII). These registers provide an additional level of control during auto-negotiation. The registers also provide a means to gather and store network status information. Register number 4 (302) generally serves as an advertisement register to alert a companion device as to the capabilities of the sending device. Register 5 (304) generally serves as a link partner ability register. Register 6 (306) serves as a parallel detection register. For each register, different bits might be used to indicate a variety of conditions.

In the following text and Figures, the various Ethernet modes are referred to in shortened notation for convenience. For instance, the reference to 100 Full stands for 100 Mbps, full duplex; 10 Full stands for 10 Mbps, full duplex; 10 Half stands for 10 Mbps, half duplex; 100 Half stands for 100 Mbps, half duplex; and 100T4 stands for 100 Mbps, T4 mode. Finally "auto" refers to auto-negotiation mode. For auto mode, a device will advertise all its capabilities (or abilities) during auto-negotiation using the IEEE 802.3u standard. The device should only advertise those technology capabilities which it supports. For each of the other listed modes, that mode should be the only bit set within the technology ability field of the base Link Code Word (LCW) during auto-negotiation. The rest of the technology capability bits in the base LCW should be cleared, meaning that they are not supported by the device.

Figure 4:
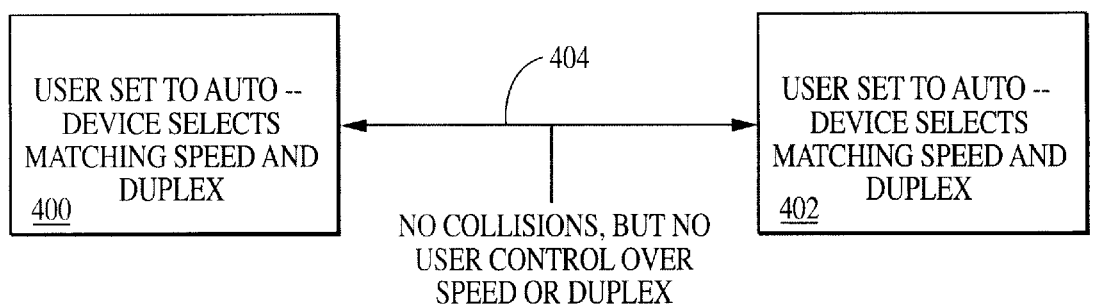
FIG. 4 is prior art block diagram of the local and link partner device set to auto mode.

Referring now to FIG. 4, a prior art block diagram is shown of a first (or local) network device 400, which has been set by the user to auto mode. A second network device 402 has also been set to auto mode. As a result, the defined standard selects a matching speed and duplex mode for the two link devices. As shown, no collisions or conflicts occur over link 404, but the user has no specific control over the speed of duplex of the local device.

Figure 5:
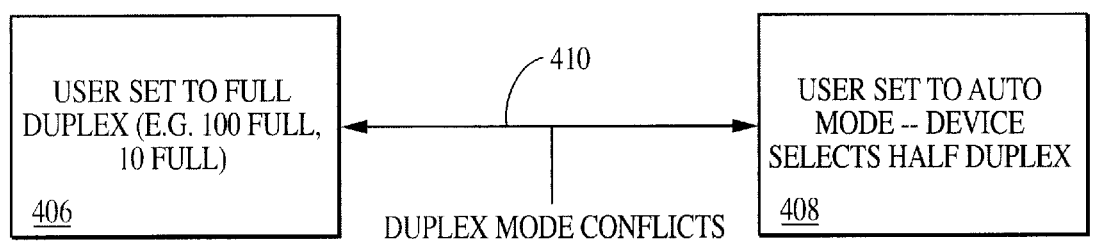
FIG. 5 is a prior art block diagram of local device set to Full Duplex mode and the link partner device set to auto mode.

FIG. 5 shows a prior art block diagram of a first network device 406 which has been user set to a Full Duplex setting, for instance 100 Full. The link partner device 408 has been set to auto mode. The result, however, can be that the link partner device 408 will detect the speed setting, but not the duplex mode through Parallel Detection. Hence, a Half Duplex setting can result, thereby causing Duplex mode collisions or conflicts 412 over the link 410.

Figure 6:
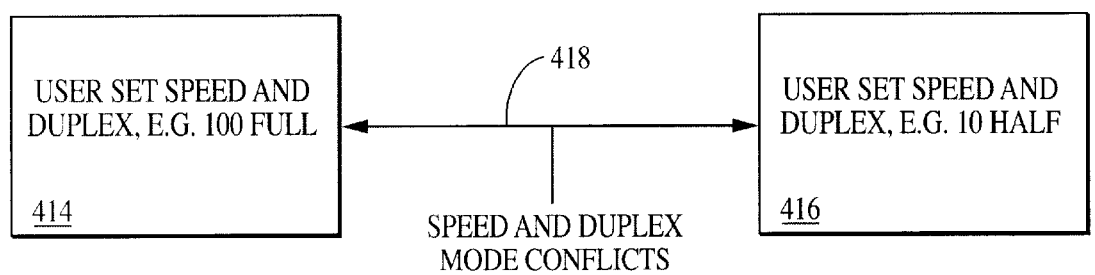
FIG. 6 is a prior art block diagram of the local device set to a user selected speed and duplex mode, and the link partner device set to a different speed and duplex mode.

FIG. 6 is a prior art block diagram illustrating a first network device 414 as connected via link 418 to a link partner device 416. In this instance, the local device 414 is set to a particular user defined speed and duplex mode, for instance 100 Full. The link partner device 416 is set to a different speed and duplex, for instance 10 Half. In this case, the link 418 will encounter both speed and duplex mode collisions or conflicts 420, and other associated problems.

Figure 7:
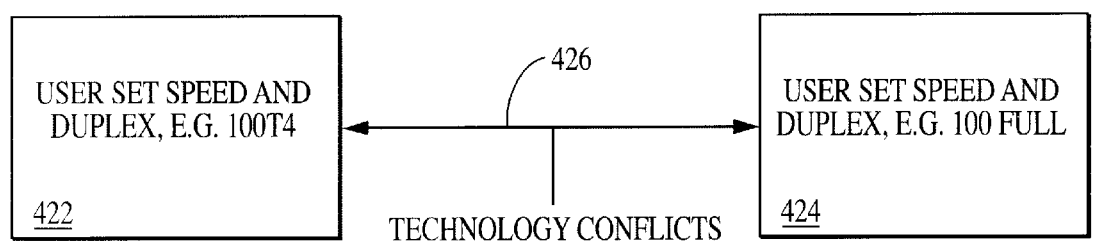
FIG. 7 is a prior art block diagram of the local device set to one technology and the link partner device set to another technology.

FIG. 7 shows a prior art block diagram of a first network device 422 which as been set to a certain speed and duplex mode, but which is also associated with a certain technology (e.g. T4). The link partner device 424 is set to a certain speed and duplex mode also, but according to a different link technology than device 422. The resulting link 426 between devices 422 and 424 will encounter technology conflicts 428.

Referring now to FIG. 8, a prior art table 800 is shown depicting various connection results for two prior devices which have been implemented without the present invention. Both the first device 802 and the second device 804 include a set of technology abilities ranging from 100 Full, 100 Half, 10 Full, 10 Half, and 100T4. When both devices are set to Auto, then the connection will be properly established at the highest common capability. When each device is set to a common speed and duplex mode, then the connection is simply made at those settings. Various other settings on the two devices produce connection problems. Such problems are denoted in table 800 by the notations "Prob. n1 (or n2 or n3)" where n# refers to a problem notation. Note 1 (Prob. n1) refers to trouble conditions caused by the two devices at both ends running at different duplex mode, meaning that a device at one end is running at full duplex mode, and a device at the other end is running at half duplex mode. Note 2 (Prob. n2) refers to trouble conditions caused by the two devices at both ends of the connection running at a different speed and duplex mode. This will most likely result in serious collision or conflict conditions. Note 3 (Prob. n3) refers to trouble conditions which are caused by the two devices at both ends of the connection running different technologies.

Figure 9:
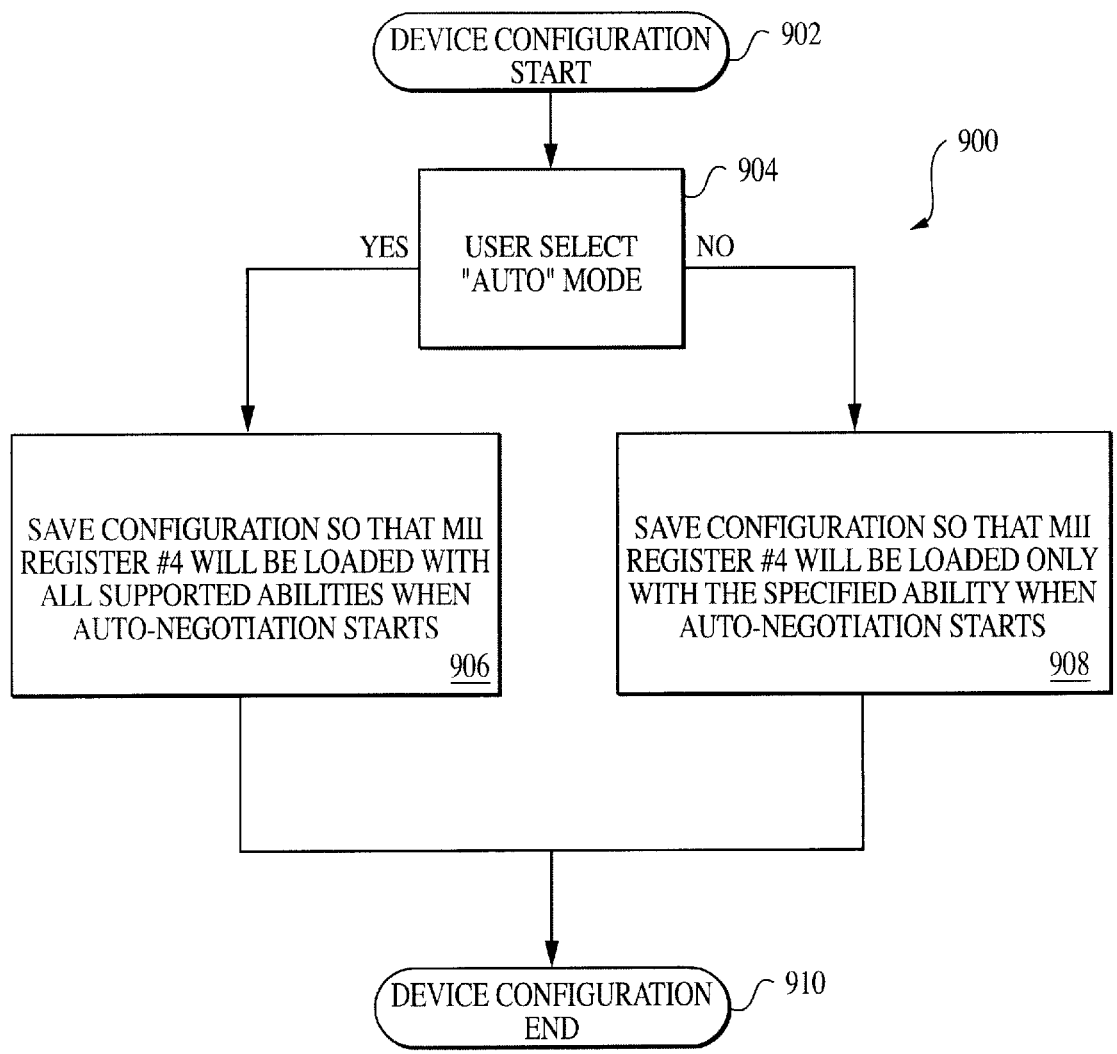
FIG. 9 is a flow chart showing device configuration phase of the present invention.

Referring now to FIG. 9, a flowchart 900 is shown of the device configuration steps of the present invention. Such steps can be accomplished, for instance, via a software user interface or the like. The device's configuration should be saved in non-volatile memory so that it will remain accessible if power is lost. In step 902, the device configuration start is shown. Next, an user selection 904 is made as to whether the device is set to auto mode (or not). If set to auto, then block 906 describes the step of saving the configuration of the device in such a way that its Advertisement Register (MII, register #4, see 302 in FIG. 3) will be loaded with all supported technology capabilities of this device when auto-negotiation starts. These technology capabilities in the Advertisement Register of the device will be reflected, or loaded, in the Link Code Word during the auto-negotiation process. If the device is not set to auto mode, then block 908 describes the step of saving the device configuration (e.g. 100 Full, 100 Half, 100T4 , 10 Full, or 10 Half) in such a way that the Advertisement Register (MII register #4) will be loaded only with one of the above specified technology capabilities when auto-negotiation starts. As before, the technology capability in the Advertisement Register of the device will be reflected in the Link Code Word during the auto-negotiation process. Thereafter, step 910 shows the device configuration end.

Figure 10:
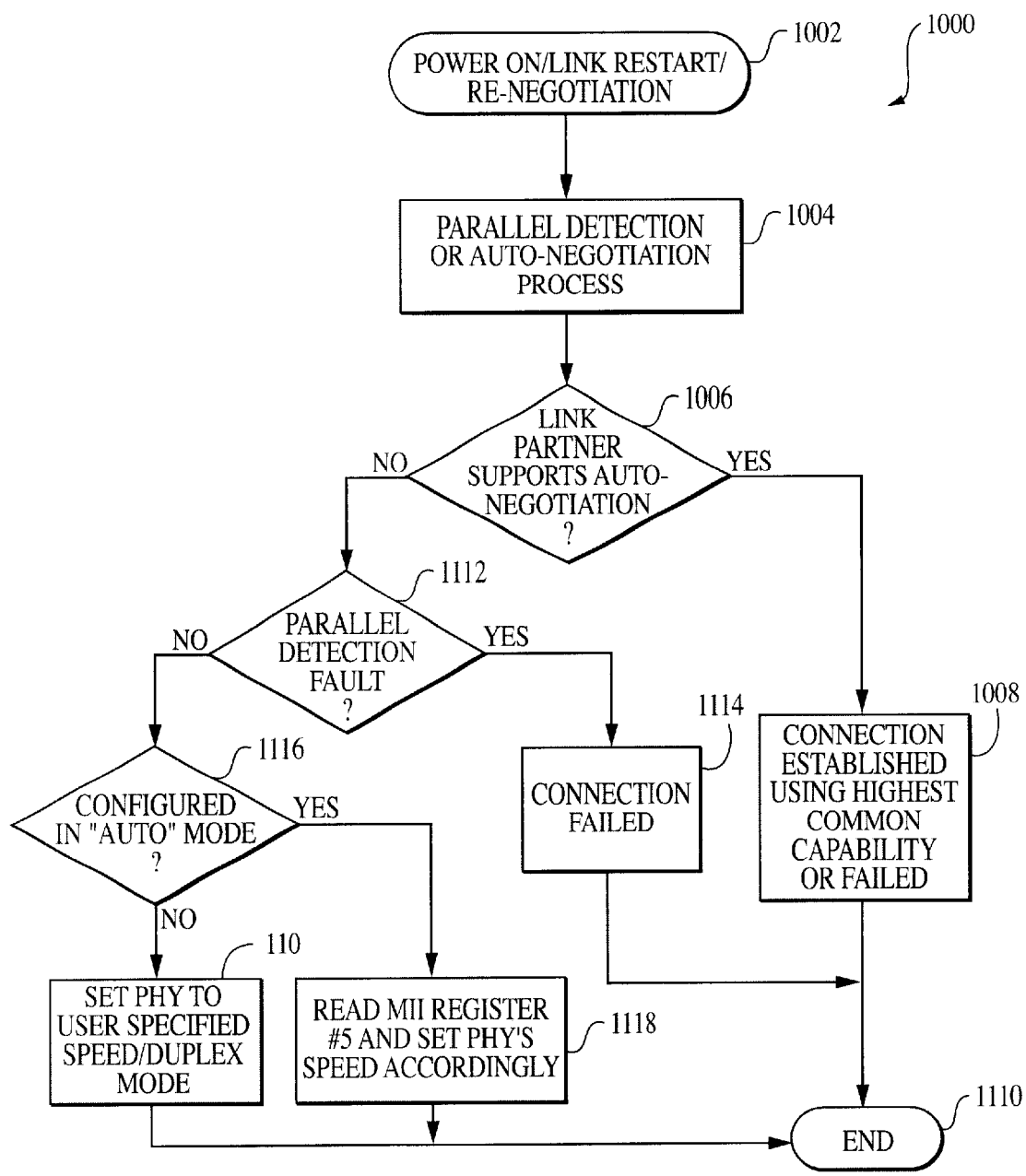
FIG. 10 is a flow chart showing device speed and duplex mode decision making process of the present invention.

Referring now to FIG. 10, a flowchart 1000 is shown of the decision making process of the present invention for setting the speed and duplex mode of a device. In step 1002, the auto-negotiation process starts at power-on, link fail, or upon a re-negotiation command. Note that if auto-negotiation exists at only one end of a twisted-pair link, it determines that the link partner does not support the auto-negotiation mechanism. Instead of exchanging configuration information, a device running auto negotiation examines the signal that it is receiving. If auto-negotiation discovers that the signal matches a technology that the device supports, then it will automatically connect to that technology. This function is known as Parallel Detection and it gives auto-negotiation the ability to be compatible with any devices that do not support auto-negotiation, yet support 10BASE-T, 100BASE-TX, or 100BASE-T4.

Further terms related to the auto-negotiation and parallel detection processes include the following:

Attachment Unit Interface (AUI)—In 10BASE-T, the interface between the MAU and the DTE within a data station.

Data Terminal Equipment (DTE)—Any source or destination of data connected to the LAN.

Fast Link Pulse (FLP) Burst—A group of no more than 33 and not less than 17 10BASE-T compatible link integrity test pulses. Each FLP Burst encodes 16 bits of data using an alternating clock and data pulse sequence.

Full Duplex—A type of networking which supports simultaneous reception and transmission.

Jabber—A condition wherein a station transmits for a period of time longer than permissible, usually due to a fault condition.

Link—The transmission path between any two interfaces of generic cabling.

Link Code Word—The 16 bits of data encoded into a Fast Link Pulse Burst.

Link Partner—The device at the opposite end of a link segment from the local device. The Link Partner device may be either a DTE or repeater.

Link pulse—Communication mechanism used in 10BASE-T and 100BASE-T networks to indicate link status and (in Auto-Negotiation equipped devices) to communicate information about abilities and negotiate communication methods. 10BASE-T uses Normal Link Pulses (NLPs), which indicate link status only. 10BASE-T and 100BASE-T devices equipped with Auto-Negotiation exchange information using a Fast Link Pulse mechanism which is compatible with 10BASE-T.

Link segment—The point-to-point full duplex medium connection between two and only two Medium Dependent Interfaces (MDIs.) local ability.

Local Device—The local station which may attempt to Auto-Negotiate with a Link Partner. The Local Device may be either a DTE or repeater.

Medium Attachment Unit (MAU)—A device containing an AUI, PMA, and MDI, used to connect a repeater or DTE to a transmission medium.

Medium Dependent Interface (MDI)—The mechanical and electrical interface between the transmission medium and the MAU (10BASE-T) or PHY (100BASE-T).

Media Independent Interface (Mul)—A signal interface which maps to MAC service definitions.

Message Code—The pre-defined 11-bit code contained in an Auto-Negotiation Message Page.

Message Page—An Auto-Negotiation Next Page encoding which contains a pre-defined 11-bit message code.

Next Page function—The algorithm which governs Next Page communication.

Next Page bit—A bit in the Auto-Negotiation Base Link Code Word that indicates there are additional Link Code Words with Next Pages to be exchanged.

Figure 14:
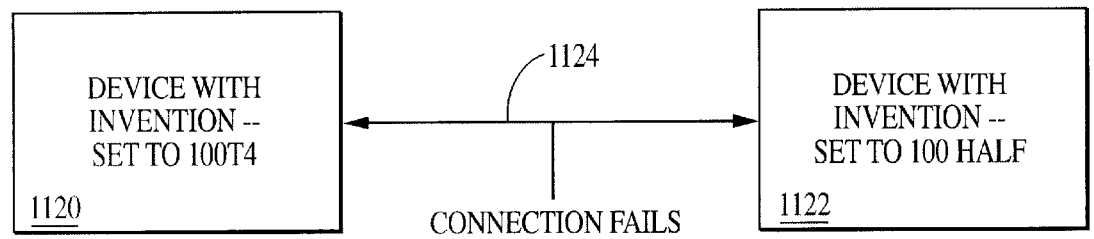
FIG. 14 is a block diagram of the local device set to one technology and the link partner device set to a different technology, with the connection failing.

NLP Receive Link Integrity Test function—Auto-Negotiation link integrity test function which allows backward compatibility with the 10BASE-T Link Integrity Test function (See FIG. 14–6 in IEEE 802.3).

NLP sequence—A Normal Link Pulse sequence, as defined in IEEE 802.3section 14.2.1.1.

Normal Link Pulse (NLP)—An out-of-band communications mechanism used in 10BASE-T to indicate link status.

Physical Layer Device (PHY)—The portion of the physical layer between the MDI and MII.

Physical Medium Attachment (PMA) sublayer—The portion of the physical layer that contains the functions for transmission, collision detection, reception, and (in the case of 100BASE-T4) clock recovery and skew alignment.

Priority Resolution function—The mechanism used by Auto-Negotiation to select the network connection type where more than one common network technology is available.

Unformatted Page—A Next Page encoding which contains an unformatted 11-bit message field. Use of his field is defined through Message Codes and information contained in the Unformatted Page message field.

Block 1004 shows steps including the process of Parallel Detection taking place before the auto-negotiation process starts. Parallel Detection allows detection of link partners that support 100BASE-TX, 100BASE-T4, and/or 10BASE-T, but do not support auto-negotiation. During Parallel Detection, if at least one of the NLP Receive Link Integrity Test functions, or the 100BASE-TX or 100BASE-T4 PMAs establishes a link status of "ready" when an auto-negotiation wait timer expires, then the auto-negotiation may not start. In the alternative, the speed and duplex mode selection of the device will be made via parallel detection. If parallel detection is completed successfully, then the parallel detection function sets an appropriate bit in the Link Partner Ability register (Mul register #5, see 304 in FIG. 3) corresponding to the technology detected by the parallel detection function.

Decision block 1006 queries whether the link partner device supports auto-negotiation. If the auto-negotiation process does not start—due to parallel detection being used instead—then this condition is indicated in the Parallel Detection register (Mul, register #6, see 306 in FIG. 3). Bit 0 is typically used as an indicator. If auto-negotiation is supported, then block 1008 shows connection being established using the highest common capability between the devices. For instance, if none of the NLP Receive Link Test Integrity functions, or 100BASE-TX, 100BASE-T4 PMAs indicates a link status of "ready" when the auto-negotiation wait timer expires, then the auto-negotiation process will start. The device and its link partner will build a connection using the highest common capability (e.g. the highest common mode, and the highest priority mode). If no common ability is shared, or if the auto-negotiation process finishes with an error, then the connection will fail, and the connection process will end 1110.

If the auto-negotiation process does not start due to parallel detection, then the status of the Parallel Detection is checked via block 1112 which inquires about fault conditions. If the Parallel Detection processes finishes with a fault, it will be indicated in the Parallel Detection register (MII Register #6, typically bit 4). The connection will then fail as shown in block 1114, and the process will end 1110.

If the Parallel Detection function finishes successfully, then the configuration mode of the device needs to be checked again in order to select a correct speed and duplex mode to match its link partner's speed and duplex mode. Decision block 1116 inquires whether the device is configured in auto mode. If the device is configured to auto mode, then the device will switch to the configuration of the link partner device. These configurations have been detected by Parallel Detection and are stored in the Mil register #5. Block 1118 includes the steps of reading the Mul register #5 and setting the speed of the physical layer device (PHY) accordingly. If the device is not set to auto mode, then block 1120 shows the step of setting the PHY to the user specified speed and duplex mode. This is an additional step over the IEEE 802.3u auto-negotiation process that provides backward compatibility with previous devices (and makes result 1509 and result 1510 possible in FIG. 17. Without this additional step, the result from result 1509 and result 1510 in FIG. 17 will be 100 Half and 10 Half respectively.) After each block 1118 and 1120, the process ends at 1110.

Figure 11:
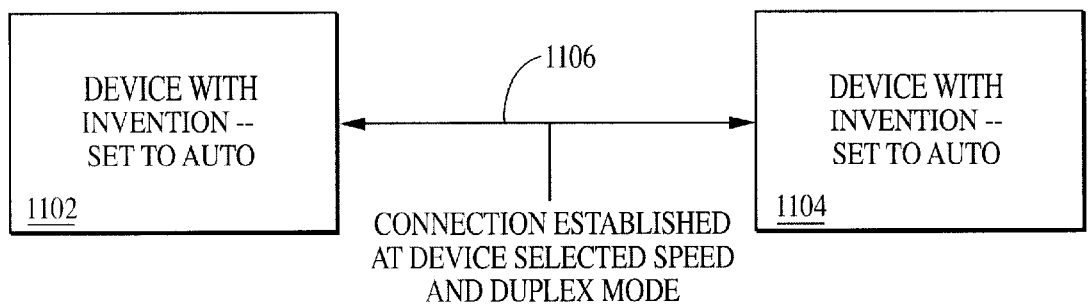
FIG. 11 is a block diagram of the local device and link partner device of the present invention set to auto.

Referring now to FIG. 11, a block diagram is shown of a first (or local) device 1102 and a link partner device 1104, each implemented with the present invention. As similar to FIG. 4, each device is set to auto, and a connection 1106 is established at a device selected speed and duplex mode.

Figure 12:
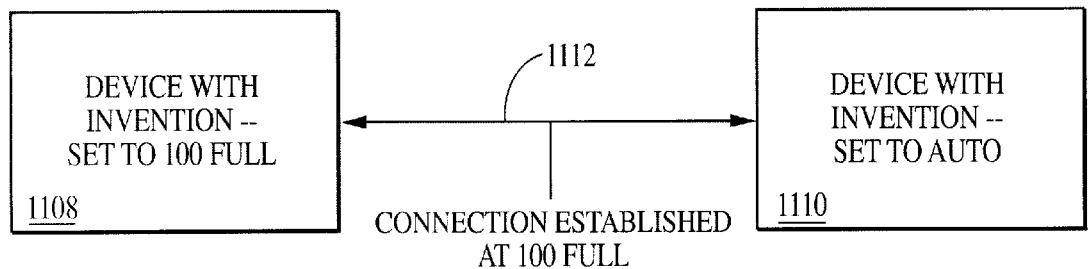
FIG. 12 is a block diagram of the local device set to a speed and duplex mode, and the link partner device establishing an equivalent connection via auto setting.

FIG. 12 shows a block diagram of a first device 1108 implemented with the present invention, and set by the user to 100 Full (for example). The link partner device 1110 is also implemented with the present invention, and has been set to auto mode. Accordingly, the link 1112 between the two devices will be established with both the correct speed and duplex mode at 100 Full.

Figure 13:
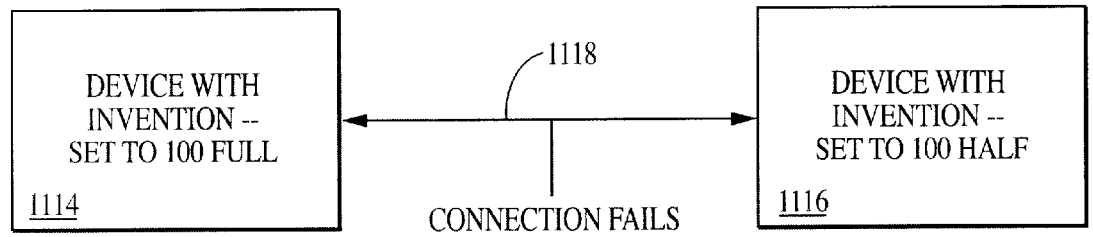
FIG. 13 is a block diagram of the local device set to a specific speed and duplex mode, and the link partner device configured to different settings, with the connection failing.

FIG. 13 shows a block diagram of a first device 1114 implemented with the present invention, and set by the user to 100 Full (for example). The link partner device 1116 has been implemented with the present invention, and has been set by the user to 100 Half (for example). In this instance, the connection 1118 will not be established, and will fail. This proves to be a more desirable result than forming a connection which will very likely result in communication errors.

FIG. 14 shows a block diagram of a first device 1120 implemented with the present invention, but set by the user to 100T4. The link partner device 1122 is similarly implemented with the present invention, and has been set to 100 Half. Once again, the connection 1124 will clearly fail to prevent technology conflict errors.

Figure 15:
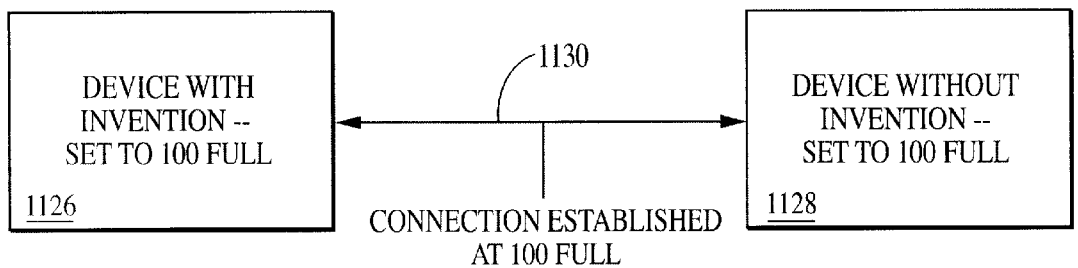
FIG. 15 is a block diagram of the local device with the invention, and the link partner device without the invention, with the connection being established at 100 Full.

FIG. 15 shows a block diagram of a first device 1126 implemented with the present invention. The link partner device 1128 is implemented without the present invention. A connection 1130 is achieved at 100 Full due to the backward compatibility which allows a device with this invention to work properly with a device configured to 100 Full but which has not been similarly implemented. In particular, the device should build a connection at 100 Full, when the devices are configured to run at this setting.

Figure 16:
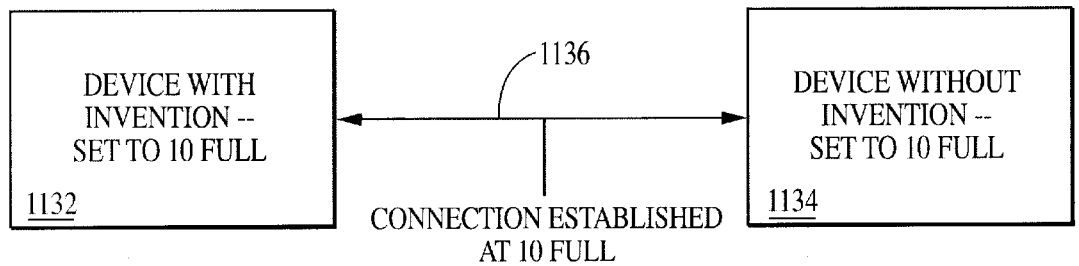
FIG. 16 is a block diagram of the local device with the invention, and the link partner device without the invention, with the connection being established at 10 Full.

FIG. 16 shows a block diagram of a first device 1132 implemented with the present invention. The link partner device 1134 is implemented without the present invention. A connection 1136 is achieved at 10 Full due to the backward compatibility which allows a device with this invention to work properly with a device configured to 10 Full but which has not been similarly implemented. In particular, the device should build a connection at 10 Full, when the devices are configured to run at this setting.

Referring now to FIG. 17, a table 1500 is shown of the connection results for a first device which has been implemented with this invention 1502, and a second device implemented without this invention 1504. The results of this table are very similar to those presented in FIG. 8, with the references to Prob. n1, n2, and n3 (Problem, note 1, note 2, and note 3) being the same. Note 4 (n.4), however, presents an improved result over table 800 for results 1506 and 1508. With implementation of the configuration steps of the present invention, a matched connection is established when device 1502 is set to 100 Full, and device 1504 is set to auto mode, and shown by result 1506. Additionally, a matched connection is established when device 1502 is set to 10 Full, and device 1504 is set to auto mode, as shown by result 1508. Backward compatibility is demonstrated by result 1509 which shows the devices building a 100 Full connection between device 1502 which is implemented with the invention and device 1504 which is implemented without the invention. Similarly, backward compatibility is demonstrated by result 1510 which shows the devices building a 10 Full connection between device 1502 which is implemented with the invention and device 1504 which is implemented without the invention.

Referring finally to FIG. 18, a table 1600 is shown with the connection results for a first device 1602 and a second device 1604, both of which are implemented with the present invention. A matched connection is achieved when device 1602 is set to auto, and device 1604 is set to any other configuration, and vice versa. Other situations produce an explicit failure condition regarding the connection attempt. For instance, if device 1602 is set to 10 Full and device 1604 is set to 100 Half, then the failure shown in 1606 results. Similarly, when device 1602 is set to 100T4 and device 1604 is set to 100 Full, the failure result 1608 is shown. The failures are expected given the user settings involved. Again, such express failures are more valuable for preserving data, managing networks, and the like, rather than establishing error prone connections.

The foregoing description has been presented for purposes of illustration and description. It is not intended to be exhaustive or to limit the invention to the precise forms disclosed. Many modifications and variations will be apparent. It is intended that the scope of the invention be defined by the following claims.

What is claimed is:

1. A method for connecting a local network device and a link partner device at matching settings, at least the local device supporting auto-negotiation mode and parallel detection, the method comprising the steps of:

configuring at least the local device to a user selection of auto-negotiation mode or not;

if set to auto-negotiation mode, then storing all supported abilities for the device;

if not set to auto-negotiation mode, then storing only the user specified ability;

performing parallel detection between the connected devices;

connecting, or failing the connection, via auto-negotiation as supported by the devices;

failing the connection if errors occurred during parallel detection;

checking at least the local device for a setting of auto-negotiation mode, if set, then retrieving the supported abilities of the link partner device and setting the local device to match the link partner device, and if not set, then setting the local device to the user specified settings.

2. The method of claim 1, wherein the local device supports the method, and the link partner device does not, and backward compatibility is achieved on certain settings.

3. The method of claim 2, wherein one setting includes 100 Full.

4. The method of claim 2, wherein one setting includes 10 Full.

5. The method of claim 1, wherein the settings include speed and duplex mode.

6. The method of claim 1, wherein the devices are an Ethernet type.

7. The method of claim 1, wherein the devices are IEEE 802.3 compatible.

8. The method of claim 1, wherein both the local device and the link partner device supports the method.

9. A method for connecting a local network device and a link partner device at matching settings, at least the local device supporting auto-negotiation mode and parallel detection, and having an advertisement, link partner ability, and parallel detection register, the method comprising the steps of:

determining and saving the supported abilities for each device in its respective advertisement register;

performing parallel detection between the connected devices;

using the results of the parallel detection to determine if the link partner device supports auto-negotiation;

if auto-negotiation is supported, then performing auto-negotiation to establish the highest common capability, or a failure to connect, between the devices;

if auto-negotiation is not supported, then checking the parallel detection register for errors;

if errors, then failing the connection;

if no errors, then determining if the device is configured in auto mode;

if in auto mode, then reading the link partner ability register and setting the local device accordingly;

if not in auto mode, then setting the local device to user specified settings.

10. The method of claim 1, wherein the local device supports the method, and the link partner device does not, and backward compatibility is achieved on certain settings.

11. The method of claim 10, wherein one setting includes 100 Full.

12. The method of claim 10, wherein one setting includes 10 Full.

13. The method of claim 9, wherein the settings include speed and duplex mode.

14. The method of claim 9, wherein the devices are an Ethernet type.

15. The method of claim 9, wherein the devices are IEEE 802.3 compatible.

16. The method of claim 9, wherein the local device supports the method, and the link partner device does not, and backward compatibility is achieved on certain settings.

17. An apparatus for connecting a local network device and a link partner device at matching settings, the apparatus comprising:

at least the local device supporting auto-negotiation mode and parallel detection, and having an advertisement, link partner ability, and parallel detection register;

an interface means for determining and saving the device capabilities in the respective advertisement register;

a device driver means for performing the following steps:

performing parallel detection between the connected devices;

connecting, or failing the connection, via auto-negotiation as supported by the devices;

failing the connection if errors are indicated in the parallel detection register;

checking the local device for a setting of auto-negotiation mode, and if set, then retrieving the supported abilities of the link partner device from the device ability register and setting the local device to match the link partner device, and if not set, then setting the local device to user specified settings.

18. The apparatus of claim 17, wherein the settings include speed and duplex mode.

19. The apparatus of claim 18, wherein the devices are of the Ethernet type.

20. An apparatus for connecting a local network device and a link partner device at matching settings, the apparatus comprising:

a means for determining and storing the supported device abilities;

a means for performing parallel detection between the devices;

a means for detecting if the link partner supports auto-negotiation, and then establishing the link at the highest common capability, or failing the link, as appropriate;

a means for failing the connection if the parallel detection was faulty;

a means for checking the configuration setting of the local device, and if set to auto mode, then retrieving the link partner abilities and setting the local device, and if not set to auto mode, then setting the local device to user specified settings.

* * * * *